(12) United States Patent
Jiang et al.

(10) Patent No.: US 8,471,132 B1
(45) Date of Patent: Jun. 25, 2013

(54) METHOD FOR MEASURING INTENSITY DISTRIBUTION OF LIGHT

(71) Applicants: Kai-Li Jiang, Beijing (CN); Jun Zhu, Beijing (CN); Chen Feng, Beijing (CN); Shou-Shan Fan, Beijing (CN)

(72) Inventors: Kai-Li Jiang, Beijing (CN); Jun Zhu, Beijing (CN); Chen Feng, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/632,420

(22) Filed: Oct. 1, 2012

(51) Int. Cl.
*H01J 19/24* (2006.01)
*H01L 21/00* (2006.01)

(52) U.S. Cl.
USPC ......... 977/742; 977/842; 423/445 R; 423/256

(58) Field of Classification Search
USPC ......... 977/742, 842; 423/445 R, 256; 445/46, 445/50; 356/445, 337; 438/100
See application file for complete search history.

(56) References Cited

U.S. PATENT DOCUMENTS

| | | | | |
|---|---|---|---|---|
| 7,811,149 | B2* | 10/2010 | Liu et al. | 445/46 |
| 7,820,133 | B2* | 10/2010 | Chen et al. | 423/447.3 |
| 7,977,131 | B2* | 7/2011 | Asano et al. | 438/41 |
| 8,077,318 | B2* | 12/2011 | Luo et al. | 356/445 |

* cited by examiner

*Primary Examiner* — Nikita Wells
(74) *Attorney, Agent, or Firm* — Altis Law Group, Inc.

(57) ABSTRACT

A method for measuring intensity distribution of light is disclosed. The method includes the steps of manufacturing a superaligned carbon nanotube array arranged on a substrate; irradiating a top surface of the superaligned carbon nanotube array with a light source and changing the morphology of the top surface of the superaligned carbon nanotube array; and obtaining an intensity distribution of the light source by analyzing the morphology of the top surface of the superaligned carbon nanotube array.

20 Claims, 6 Drawing Sheets

METHOD FOR MEASURING INTENSITY DISTRIBUTION OF LIGHT

CROSS-REFERENCE TO RELATED APPLICATIONS

This application claims all benefits accruing under 35 U.S.C. §119 from China Patent Application No. 201210192082.5, filed on Jun. 12, 2012 in the China Intellectual Property Office. This application is also related to applications entitled, "MEASURING SYSTEM OF INTENSITY DISTRIBUTION OF LIGHT", Ser. No. 13/729,285, filed on Dec. 28, 2012, "MEASURING SYSTEM OF INTENSITY DISTRIBUTION OF LIGHT", Ser. No. 13/729,279, filed on Dec. 28, 2012, "METHOD FOR MEASURING INTENSITY DISTRIBUTION OF LIGHT", Ser. No. 13/729,522, filed on Dec. 28, 2012, and "METHOD FOR MEASURING INTENSITY DISTRIBUTION OF LIGHT", Ser. No. 13/729,300, filed on Dec. 28, 2012. The disclosures of the above-identified applications are incorporated herein by reference.

BACKGROUND

1. Technical Field

The present disclosure relates to methods for measuring light intensity distribution.

2. Description of Related Art

To measure an intensity distribution of a light source, known methods including placing a sensor at a position having a determined distance away from the light source, and then moving the sensor around a circumference of a circle with the light source as a center of the circle. Other known methods placing a sensor at positions having different distances away from the light source. These known methods require moving the sensor to obtain a plurality of testing data while measuring the intensity distribution of the light source.

The sensors used in measuring intensity distributions of light sources can be classified into two types: thermal and photonic. The thermal sensors are low-cost and can be operated at room temperature but have low sensitivities and low response speeds. The photonic sensors have high sensitivities and high response speeds. However, the photonic sensors are high-cost and cannot be operated at room temperature.

What is needed, therefore, is to provide a highly sensitive method for measuring intensity distributions of light sources at room temperature. The sensor used in the method is low-cost and need not be moved while measuring.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
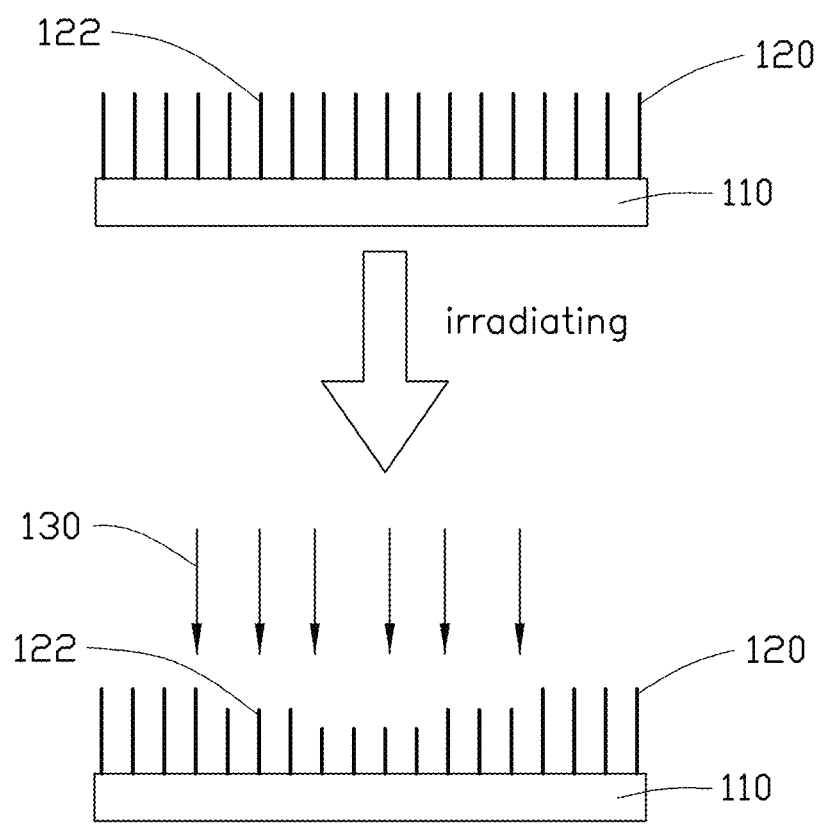
FIG. 1 is a process flow diagram of a method for measuring an intensity distribution of a light source according to one embodiment.
Figure 2:
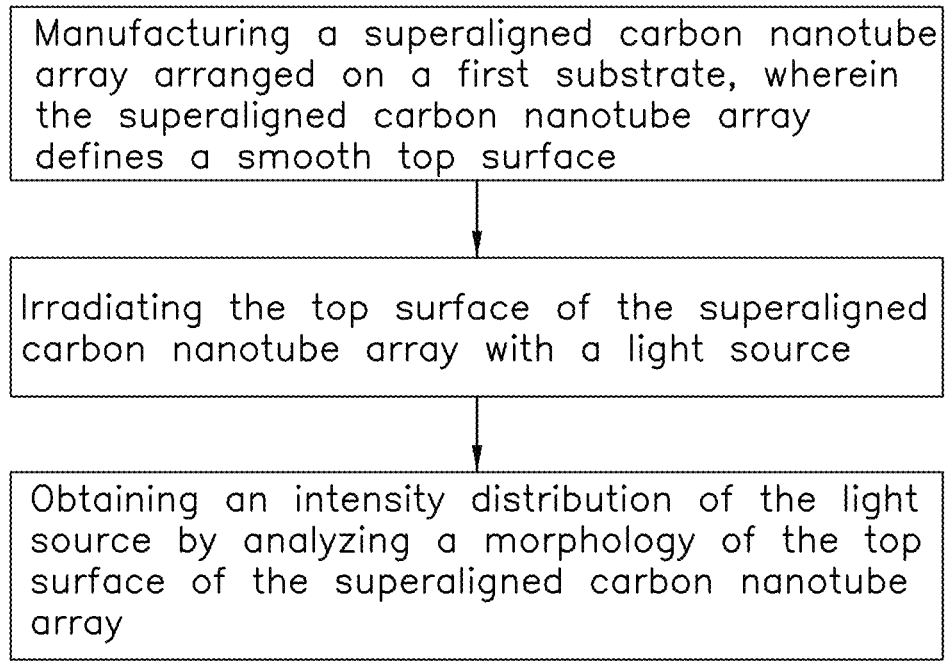
FIG. 2 is a flowchart of the method for measuring the intensity distribution of the light source of FIG. 1.

Referring to FIG. 1 and FIG. 2, a method for measuring intensity distribution of light in one embodiment includes the steps of:

(S1), manufacturing a superaligned carbon nanotube array 120 arranged on a first substrate 110, wherein the superaligned carbon nanotube array 120 defines a top surface 122, the top surface 122 is substantially smooth;

(S2), irradiating the top surface 122 of the superaligned carbon nanotube array 120 with a light source 130; and (S3), obtaining an intensity distribution of the light source 130 by analyzing a morphology of the top surface 122 of the superaligned carbon nanotube array 120.

In step (S1), the superaligned carbon nanotube array 120 is manufactured by chemical vapor deposition process in one embodiment. The chemical vapor deposition process includes the steps of:

(S11), providing a substantially flat and smooth second substrate, wherein the second substrate can be a P-type silicon substrate, an N-type silicon substrate, or a silicon substrate having oxide layer located thereon. In one embodiment, the second substrate is a P-type silicon substrate having a width of about 4 inches;

(S12), forming a catalyst on the second substrate, wherein the catalyst can be made of iron, cobalt, nickel, or any combination alloy thereof;

(S13), annealing the second substrate with the catalyst at a temperature ranges from about 700° C. to about 900° C. in air for about 30 minutes to about 90 minutes;

(S14), heating the second substrate with the catalyst at a temperature ranges from about 500° C. to about 740° C. in a furnace with a protective gas environment; and (S15), supplying a carbon source gas to the furnace for about 5 minutes to about 30 minutes and growing the superaligned carbon nanotube array 120, wherein the carbon source gas may be hydrocarbon gas, such as ethylene, methane, acetylene, ethane, or any combination thereof.

In step (S1), the superaligned carbon nanotube array 120 is substantially free of impurities, such as residual catalyst particle or amorphous carbon, by controlling the growing conditions of the chemical vapor deposition. The carbon nanotubes in the superaligned carbon nanotube array 120 are vertically aligned on the second substrate and attracted with each other by van der Waals attractive force therebetween. The height of the superaligned carbon nanotube array 120 can range from about 100 microns to about 1000 microns. In one embodiment, the height of the superaligned carbon nanotube array 120 ranges from about 300 microns to about 500 microns.

In step (S1), the carbon nanotubes in the superaligned carbon nanotube array 120 may be single-walled carbon nanotubes, double-walled carbon nanotubes, multi-walled carbon nanotubes, or their combinations. The single-walled carbon nanotube has a diameter of about 0.5 nanometers (nm) to about 50 nm. The double-walled carbon nanotube has a diameter of about 1.0 nm to about 50 nm. The multi-walled carbon nanotube has a diameter of about 1.5 nm to about 50 nm. In one embodiment, the carbon nanotubes are multi-walled carbon nanotubes and have a height of about 100 microns to about 1000 microns.

In step (S1), the first substrate 110 can be made of metallic materials, inorganic materials, or polymer material. The second substrate can also be used as the first substrate 110, which can omit the transferring process of the superaligned carbon nanotube array 120.

In step (S2), the light source 130 can be infrared light, ultraviolet light or visible light. In one embodiment, an infrared light is used as the light source 130.

In step (S2), define α as an irradiating angle of the light source 130, which is between the light beam and the first substrate 110, wherein α is equal to or larger than 60 degrees and is smaller than or equal to 90 degrees. In one embodiment, the irradiating angle α is about 90 degrees such that the light beam is substantially vertical to the top surface 122 of the superaligned carbon nanotube array 120.

In step (S2), an irradiating time of the light source 130 is correlated with a power of the light source 130. In one embodiment, the irradiating time ranges from about 3 seconds to about 5 seconds while the power of the light source 130 ranges from about 1 watt to about 20 watts. In another embodiment, the irradiating time ranges from about 2 seconds to about 3 seconds while the power of the light source 130 ranges from about 20 watts to about 50 watts. In another embodiment, the irradiating time is less than 1 second while the power of the light source 130 is larger than 100 watts.

In step (S3), the analysis of the morphology of the top surface 122 of the superaligned carbon nanotube array 120 is performed by a microscope. The microscope can be a scanning electron microscope (SEM), a transmission electron microscope, or an optical microscope. In one embodiment, a SEM is used to analyze the morphology of the top surface 122 of the superaligned carbon nanotube array 120. Firstly, an image of the morphology of the top surface 122 of the superaligned carbon nanotube array 120 is taken by the SEM. Secondly, the intensity distribution of the light source 130 is obtained by analyzing the image of the morphology of the top surface 122 of the superaligned carbon nanotube array 120. The intensity of the light source 130 can be identified by comparing depths of colors in various areas of the image. The deeper the color of the image is, the higher the intensity of the light source 130 is.

Figure 3:
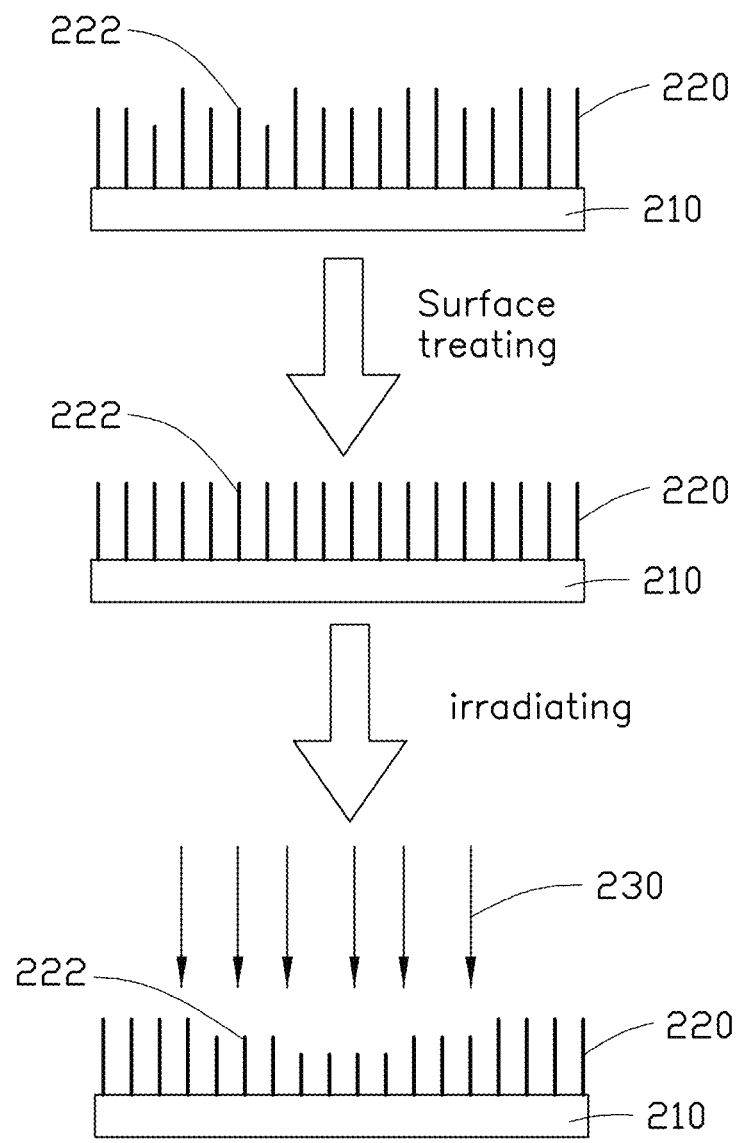
FIG. 3 is a process flow diagram of a method for measuring an intensity distribution of a light source according to another embodiment.
Figure 4:
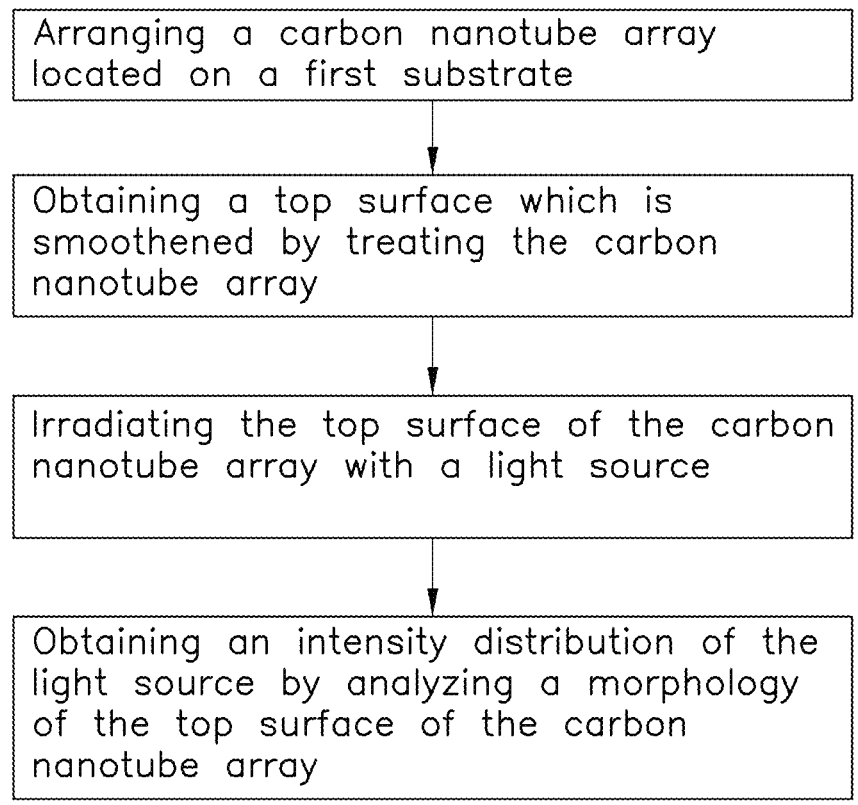
FIG. 4 is a flowchart of the method for measuring the intensity distribution of the light source of FIG. 3.

Referring to FIG. 3 and FIG. 4, a method for measuring intensity distribution of light in other embodiment includes the steps of:

(S1), manufacturing a carbon nanotube array 220 arranged on a first substrate 210;

(S2), obtaining a top surface 222 which is smoothened by treating the carbon nanotube array 220;

(S3), irradiating the top surface 222 of the carbon nanotube array 220 with a light source 230; and (S4), obtaining an intensity distribution of the light source 230 by analyzing the morphology of the top surface 222 of the carbon nanotube array 220.

In step (S1), the first substrate 210 can be made of metallic materials, inorganic materials, or polymer material. In one embodiment, the first substrate 210 is made of silicon.

The carbon nanotube array 220 can be fabricated by chemical vapor deposition process. The carbon nanotube array 220 includes a plurality of carbon nanotubes. Most of the plurality of carbon nanotubes in the carbon nanotube array 220 are vertically aligned on the first substrate 210. Each of the plurality of carbon nanotubes has a first end and a second end opposite to the first end. The first ends of the plurality of carbon nanotubes compose a top surface 222 of the carbon nanotube array 220. The top surface 222 of the carbon nanotube array 220 is not substantially smooth due to the differences between the heights of the carbon nanotubes. The average height of the carbon nanotube array 220 can range from about 100 microns to about 1000 microns. In one embodiment, the average height of the carbon nanotube array 220 ranges from about 400 microns to about 600 microns.

The carbon nanotubes in the carbon nanotube array 220 may be single-walled carbon nanotubes, double-walled carbon nanotubes, multi-walled carbon nanotubes, or their combinations. The single-walled carbon nanotube has a diameter of about 0.5 nm to about 50 nm. The double-walled carbon nanotube has a diameter of about 1.0 nm to about 50 nm. The multi-walled carbon nanotube has a diameter of about 1.5 nm to about 50 nm. In one embodiment, the carbon nanotubes are multi-walled carbon nanotubes and have an average height of about 100 microns to about 1000 microns.

In step (S2), the top surface 222 can be smoothened by scanning the carbon nanotube array 220 with laser. In one embodiment, a power density of the laser is higher than 1000 watts per square meter. A diameter of the light spot of the laser ranges from about 1 millimeter to about 5 millimeter. A scanning speed of the laser is no more than 10 millimeters per second.

In step (S2), the top surface 222 can also be smoothened by the substeps of:

(S21), sticking the carbon nanotube array 220 to a third substrate; and (S22), separating the carbon nanotube array 220 from the first substrate 210;

In substep (S21), the third substrate has a stronger binding force with the carbon nanotube array 220 than the first substrate 210. In one embodiment, the third substrate is made of silicone rubber.

In substep (S22), the carbon nanotubes in the carbon nanotube array 220 are substantially vertical to the third substrate when the carbon nanotube array 220 is separated from the first substrate 210. After separating, the carbon nanotube array 220 is transferred to the third substrate from the first substrate 210. An original bottom surface of the carbon nanotube array 220 becomes the top surface 222 of the present carbon nanotube array. The obtained top surface 222 is obviously smooth and can be used in step (S3).

In step (S3), the light source 230 can be infrared light, ultraviolet light or visible light. In one embodiment, an infrared light is used as the light source 230.

α is defined as an irradiating angle of the light source 230, which is between the light beam and the first substrate 210 or the third substrate, wherein α is equal to or larger than 60 degrees and is smaller than or equal to 90 degrees. In one embodiment, the irradiating angle α is about 90 degrees such that the light beam is substantially vertical to the top surface 222 of the carbon nanotube array 220.

An irradiating time of the light source 230 is correlated with a power of the light source 230. In one embodiment, the irradiating time ranges from about 3 seconds to about 5 seconds while the power of the light source 230 ranges from about 1 watt to about 20 watts. In another embodiment, the irradiating time ranges from about 2 seconds to about 3 seconds while the power of the light source 230 ranges from about 20 watts to about 50 watts. In another embodiment, the irradiating time is less than 1 second while the power of the light source 230 is larger than 100 watts.

While irradiating, the carbon nanotubes in the carbon nanotube array 220 absorb photons of the light source 230 and produce heats. The higher the intensity of the light source 230 in the certain region is, the more photons are absorbed by the carbon nanotubes, the more the heats produced by the carbon nanotubes are, and the higher the temperature of the carbon nanotubes is. As the temperature increases, the carbon nanotubes begin to react with oxide. While reacting, the first ends of the carbon nanotubes are firstly ablated and then extend along the axis of the carbon nanotubes. Therefore, the carbon nanotubes are ablated more when irradiated with higher-intensity light source 230. After irradiating, some of the carbon nanotubes in the carbon nanotube array 220 are ablated and the heights of some of the carbon nanotubes are changed. Thus, the top surface 222 of the carbon nanotube array 220 is no longer smooth. The morphology of the top surface 222 can reflect the intensity distribution of the light source 230.

In step (S4), the analysis of the morphology of the top surface 222 of the carbon nanotube array 220 is performed by a microscope. The microscope can be a SEM, a transmission electron microscope, or an optical microscope. In one embodiment, a SEM is used to analyze the morphology of the top surface 222 of the carbon nanotube array 220. Firstly, an image of the morphology of the top surface 222 of the carbon nanotube array 220 is taken by the scanning electron microscope. Secondly, the intensity distribution of the light source 230 is obtained by analyzing the image of the morphology of the top surface 222 of the carbon nanotube array 220. The intensity of the light source 230 can be identified by comparing depths of colors in various areas of the image. The deeper the color of the image is, the higher the intensity of the light source 230 is. Thus, an intensity distribution of the light source 230 can finally be obtained.

Figure 5:
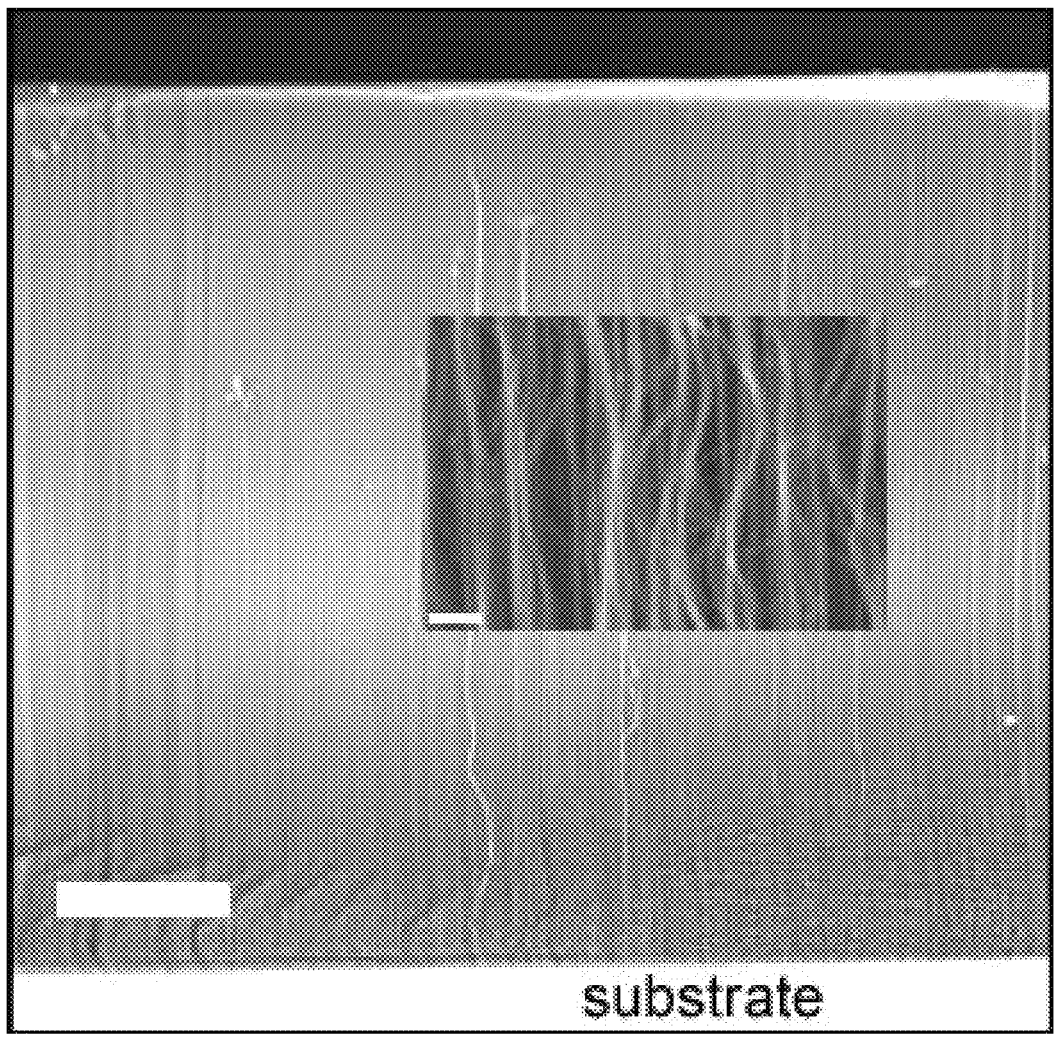
FIG. 5 is a scanning electron microscopy (SEM) image of a carbon nanotube array used in a method for measuring an intensity distribution of a light source according to one embodiment.
Figure 6:
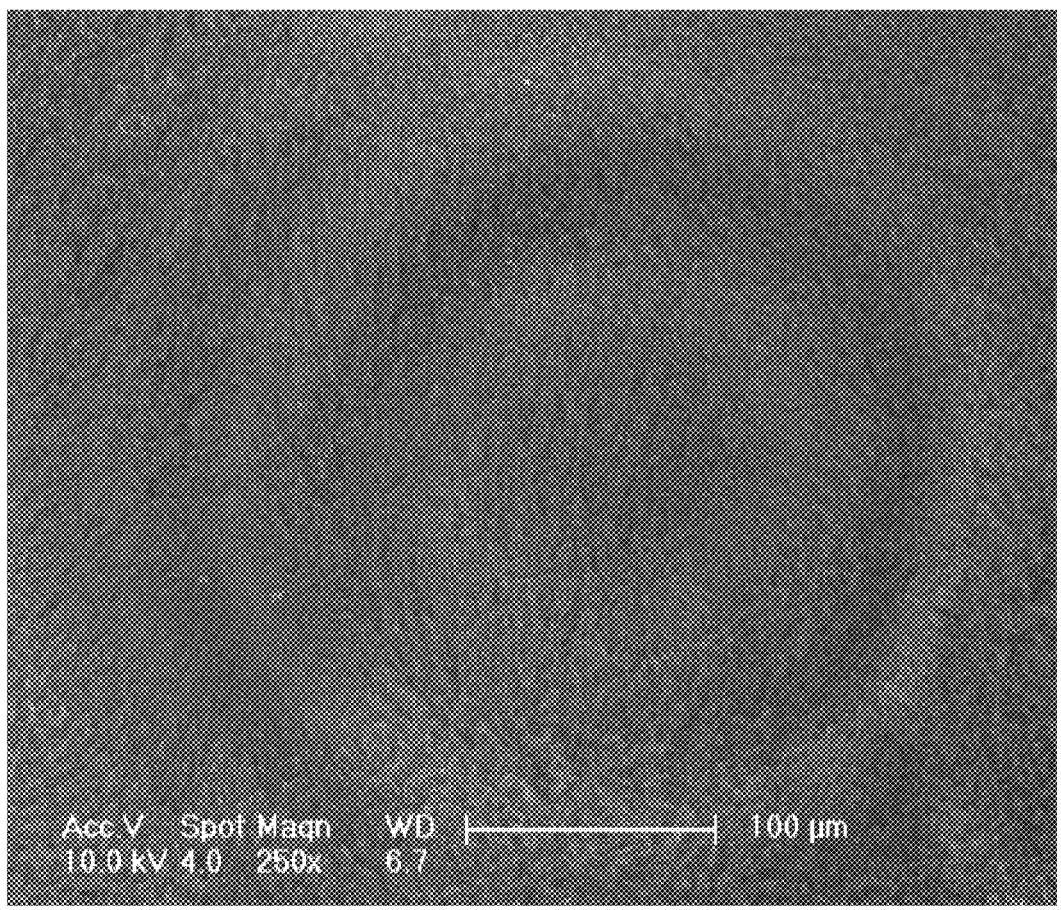
FIG. 6 is a scanning electron microscopy (SEM) image showing intensity distribution of a light source obtained by a method for measuring an intensity distribution of a light source according to another embodiment.

FIG. 5 shows a SEM image of the carbon nanotube array 220 used in one embodiment. A SEM image of intensity distribution of the light source 230 according to one embodiment is shown in FIG. 6. The concentric annular light spots in FIG. 6 imply that the intensity of the light source 230 is also distributed in annular shape.

The method for measuring intensity distribution of light in current disclosure has the following advantages: (a) the method uses carbon nanotube array as sensor, which is highly sensitive to light, especially to infrared light, thus, the method has high sensitivity when measuring intensity distribution of light; (b) the thermal property of the carbon nanotube is anisotropic, which means heats conducts almost only along the axis of the carbon nanotube but not along the radial direction of the carbon nanotube, thus, the method has high resolution when measuring intensity distribution of light; and (c) after irradiating with light, the morphology of the top surface of the carbon nanotube array can be permanently saved, thus, the information of intensity distribution of light also can be saved permanently.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for measuring intensity distribution of light comprising:
    (a) manufacturing a superaligned carbon nanotube array arranged on a first substrate, wherein the superaligned carbon nanotube array defines a smooth top surface;
    (b) irradiating the top surface of the superaligned carbon nanotube array with a light source; and
    (c) obtaining an intensity distribution of the light source by analyzing a morphology of the top surface of the superaligned carbon nanotube array.

2. The method as claimed in claim 1, the step (a) comprising arranging the top surface of the superaligned carbon nanotube array substantially parallel to the first substrate.

3. The method as claimed in claim 1, wherein the superaligned carbon nanotube array is manufactured by steps of:
    (a1) providing a substantially flat and smooth second substrate;
    (a2) forming a catalyst on the second substrate;
    (a3) annealing the second substrate with the catalyst at a temperature ranging from about 700° C. to about 900° C. in air for about 30 minutes to about 90 minutes;
    (a4) heating the second substrate with the catalyst at a temperature ranging from about 500° C. to about 740° C. in a furnace with a protective gas environment; and
    (a5) supplying a carbon source gas to the furnace for about 5 minutes to about 30 minutes and growing the superaligned carbon nanotube array.

4. The method as claimed in claim 1, the step (a) comprising manufacturing the superaligned carbon nanotube array from a plurality of carbon nanotubes parallel to each other, and arranging the plurality of carbon nanotubes vertically aligned on the first substrate.

5. The method as claimed in claim 1, the step (a) comprising manufacturing the superaligned carbon nanotube array to a height ranging from about 100 microns to about 1000 microns.

6. The method as claimed in claim 1, wherein an irradiating angle is defined between a light beam of the light source and the first substrate, and the step (b) comprises irradiating the top surface at the irradiating angle ranging from about 60 degrees to about 90 degrees.

7. The method as claimed in claim 1, the step (b) comprising irradiating the top surface for an irradiating time less than 5 seconds.

8. The method as claimed in claim 1, the step (b) comprising irradiating the top surface with a power of the light source larger than 1 watt.

9. The method as claimed in claim 1, wherein the analyzing of the morphology of the top surface of the superaligned carbon nanotube array is performed by a microscope.

10. The method as claimed in claim 9, wherein the microscope is selected from the group consisting of scanning electron microscope, transmission electron microscope, and optical microscope.

11. A method for measuring intensity distribution of light comprising:
    (a) arranging a carbon nanotube array located on a first substrate;
    (b) obtaining a top surface which is smoothened by treating the carbon nanotube array;
    (c) irradiating the top surface of the carbon nanotube array with a light source; and
    (d) obtaining an intensity distribution of the light source by analyzing a morphology of the top surface of the carbon nanotube array.

12. The method as claimed in claim 11, the step (b) comprising smoothening the top surface by scanning the carbon nanotube array with a laser.

13. The method as claimed in claim 12, wherein a power density of the laser is higher than 1000 watts per square meter, a diameter of a light spot of the laser ranges from about 1 millimeter to about 5 millimeter, and a scanning speed of the laser is equal to or lower than 10 millimeters per second.

14. The method as claimed in claim 11, wherein the top surface is smoothened by:
(b1) sticking the carbon nanotube array to a third substrate; and
(b2) separating the carbon nanotube array from the first substrate.

15. The method as claimed in claim 11, wherein an irradiating angle is defined between a light beam of the light source and the first substrate, and the step (c) comprises irradiating the top surface at the irradiating angle ranging from about 60 degrees to about 90 degrees.

16. The method as claimed in claim 11, the step (c) comprising irradiating the top surface for an irradiating time ranging from about 3 seconds to about 5 seconds, and with a power of the light source ranging from about 1 watt to about 20 watts.

17. The method as claimed in claim 11, the step (c) comprising irradiating the top surface for an irradiating time ranging from about 2 seconds to about 3 seconds, and with a power of the light source ranging from about 20 watts to about 50 watts.

18. The method as claimed in claim 11, the step (c) comprising irradiating the top surface for an irradiating time less than 1 second, and with a power of the light source larger than 100 watts.

19. The method as claimed in claim 11, wherein the analyzing of the morphology of the top surface of the carbon nanotube array is performed by a microscope.

20. The method as claimed in claim 19, in the step (d), the analyzing of the morphology comprises taking an image of the top surface of the carbon nanotube array by the microscope and analyzing an intensity distribution of the light source by comparing depths of colors in various areas of the image.

* * * * *

UNITED STATES PATENT AND TRADEMARK OFFICE
CERTIFICATE OF CORRECTION

PATENT NO. : 8,471,132 B1
APPLICATION NO. : 13/632420
DATED : June 25, 2013
INVENTOR(S) : Kai-Li Jiang et al.

It is certified that error appears in the above-identified patent and that said Letters Patent is hereby corrected as shown below:

Please add item 30 regarding "Foreign Application Priority Data" on the title page with the following:

(30)    Foreign Application Priority Data

Jun. 12, 2012 (CN) ...................... 2012101920825

Signed and Sealed this
Twelfth Day of July, 2016

Michelle K. Lee
*Director of the United States Patent and Trademark Office*